UNITED STATES PATENT OFFICE.

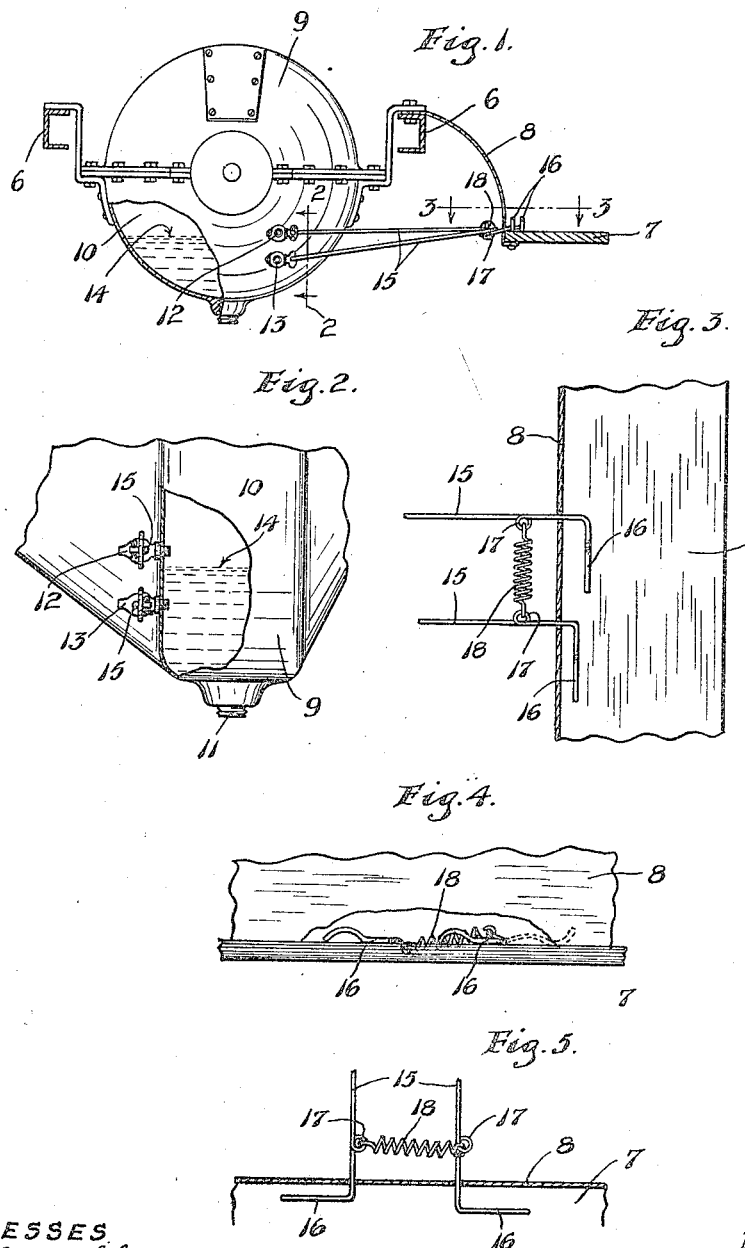

MERIT E. WILSON, OF WATERTOWN, SOUTH DAKOTA.

ATTACHMENT FOR AUTOMOBILES.

1,265,408.

Specification of Letters Patent.

Patented May 7, 1918.

Application filed February 1, 1918. Serial No. 214,797.

*To all whom it may concern:*

Be it known that I, MERIT E. WILSON, a citizen of the United States, residing at Watertown, in the county of Codington and State of South Dakota, have invented certain new and useful Improvements in Attachments for Automobiles; and I do hereby declare the following to be a full, clear, and exact description of the invention, such as will enable others skilled in the art to which it appertains to make and use the same.

My invention relates to improvements in attachments for automobiles of the Ford or other types having an oil chamber with upper and lower pet cocks for determining the amount of oil in the engine crank case. These pet cocks, as is well known, are so located as to make it necessary to get in under an automobile in making the required tests. The object of my invention is to provide simple and efficient means for operating the pet cocks at the side of the automobile, thus making it unnecessary to get under the same.

To the above end, the invention consists of the novel devices and combinations of devices hereinafter described and defined in the claims.

In the accompanying drawings, which illustrate the invention, like characters indicate like parts throughout the several views.

Referring to the drawings,

Figure 1 is a view taken transversely through an automobile having the invention applied thereto;

Fig. 2 is a view, partly in side elevation and partly in section, taken on the line 2—2 of Fig. 1;

Fig. 3 is a view, partly in plan and partly in horizontal section, taken on the line 3—3 of Fig. 1;

Fig. 4 is a side elevation of the parts shown in Fig. 3, with some parts broken away; and Fig. 5 is a view corresponding to Fig. 3, but showing certain of the parts moved into different positions.

Of the parts of the automobile illustrated, which is of the Ford type, it is only necessary to note the frame 6, running board 7, guard 8 between the running board and frame, engine crank case 9 having an oil chamber 10, with a bottom drain normally closed by a plug, and upper and lower pet cocks 12 and 13, respectively. The oil level is indicated in the crank case 9 and 14. The parts thus far described are of standard and well known construction.

The pet cocks 12 and 13 are independently opened and closed by operating rods 15, the inner ends of which are bent laterally and inserted through bores in the stems of said pet cocks and held against removal therefrom by cotter pins, or other suitable means. The rods 15 extend out from the pet cocks 12 and 13 and through apertures in the guard 8, just above the running board 7, and their outer ends are bent to form laterally projecting hand pieces 16, which project rearward, when the pet cocks are closed. These hand pieces 16 are curved upward, as best shown in Fig. 4, in order that they may be more easily grasped, when operated to open the pet cocks 12 and 13. It will also be noted, by reference to Fig. 3, that the hand pieces 16 are located, one in advance of the other, and laterally offset so that they do not interfere with each other, when independently operating the pet cocks.

Each operating rod 15, just inward of the guard 8, is bent to form a crank, which, as shown, is in the form of a loop 17. By reference to Figs. 3 and 4, it will be noted that when the pet cocks 12 and 13 are closed, the crank on the rod operating the upper pet cock projects upwardly and rearwardly, while the one on the rod operating the lower pet cock projects downwardly and forwardly. A coiled spring 18 connects the two cranks 17 and is under strain to move said crank into positions to close the pet cocks.

Obviously, the spring 18 permits the rods 15 to be independently operated for opening and closing the pet cocks and it normally holds the hand pieces 16 against the running board 7, which acts as a stop to limit the closing movement of the pet cocks. The spring 18 also permits the crank on the rod operating the upper pet cock to be moved past a dead center, whereby the respective hand piece 16 will be held against the running board 7, as indicated by broken lines in Fig. 4, with the pet cock 12 open.

The connections between the cranks 17 and spring 18 are such as to afford slip connections, whereby, during the final opening movement of the pet cocks, the ends of the spring 18 will slide on the cranks 17, and thereby reduce the tension on said spring, making it easy to hold the pet cocks open by means of the hand pieces 16.

From the above description, it is evident that the pet cocks 12 and 13 may be easily and independently operated by a person standing at one side of the car and by looking under the car, he can observe whether or not oil is discharged from either of the pet cocks, when opened. The oil in the chamber 10 should not be above the pet cock 12 or below the pet cock 13. By opening these pet cocks, a person can determine whether or not there is the proper amount of oil in the engine crank case.

What I claim is:—

1. A vehicle having an engine and an oil chamber with a pet cock, in combination with an operating rod for opening and closing the pet cock, said rod having a crank, of a spring under strain to close the pet cock and having a slip connection with said crank, whereby the tension of the spring is decreased when the operating rod is moved into a position to open the pet cock.

2. A vehicle having an engine and an oil chamber with two pet cocks, in combination with a pair of operating rods for independently opening and closing the pet cock, of a single spring operative on said two rods for independently and yieldingly holding the pet cocks in closed position.

3. A vehicle having an engine and an oil chamber with upper and lower pet cocks, in combination with a pair of operating rods for independently opening and closing the pet cocks, of a single spring operative on said two rods for independently and yieldingly holding the pet cocks in closed position and for holding the upper pet cock in an open position.

4. A vehicle having an engine and an oil chamber with upper and lower pet cocks, in combination with a pair of operating rods for independently opening and closing the pet cocks, each of said operating rods having a crank, of a single spring connection between said two rods for independently and yieldingly holding the pet cocks in closed position.

5. A vehicle having an engine and an oil chamber with upper and lower pet cocks, in combination with a pair of operating rods for independently opening and closing the pet cocks, each of said operating rods having a crank, of a single spring connection between said two rods for independently and yieldingly holding the pet cocks in closed position, said spring having slip connections with the cranks, whereby the tension thereof is decreased when either one of the operating rods is moved to an extreme position to open the respective pet cock.

In testimony whereof I affix my signature in presence of two witnesses.

MERIT E. WILSON.

Witnesses:
R. D. GOEPFERT,
M. E. GRAY.